US010348125B2

(12) United States Patent
Carnemark et al.

(10) Patent No.: US 10,348,125 B2
(45) Date of Patent: Jul. 9, 2019

(54) DEVICES AND METHODS FOR RELIABLE POWER SUPPLY FOR ELECTRONIC DEVICES

(71) Applicant: INERTECH IP, LLC, Plano, TX (US)

(72) Inventors: Jakob Carnemark, Fairfield, CT (US); Piero Oliveri, Monroe Township, NJ (US)

(73) Assignee: INERTECH IP LLC, Plano, TX (US)

( * ) Notice: Subject to any disclaimer, the term of this patent is extended or adjusted under 35 U.S.C. 154(b) by 58 days.

(21) Appl. No.: 15/141,406

(22) Filed: Apr. 28, 2016

(65) Prior Publication Data

US 2016/0322863 A1 Nov. 3, 2016

Related U.S. Application Data

(60) Provisional application No. 62/153,848, filed on Apr. 28, 2015.

(51) Int. Cl.
*H02J 9/06* (2006.01)
*H02J 3/38* (2006.01)

(52) U.S. Cl.
CPC ............ *H02J 9/061* (2013.01); *H02J 3/381* (2013.01); *H02J 2009/068* (2013.01)

(58) Field of Classification Search
CPC .................................................. H02J 9/02–08
See application file for complete search history.

(56) References Cited

U.S. PATENT DOCUMENTS

| 8,212,401 | B2 | 7/2012 | Linkhart et al. |
| 8,294,297 | B2 | 10/2012 | Linkhart et al. |
| 9,793,752 | B1 * | 10/2017 | Morales .................... H02J 9/04 |
| 10,014,713 | B1 * | 7/2018 | Nguyen ................. H02J 9/061 |

(Continued)

FOREIGN PATENT DOCUMENTS

| WO | WO2014/011706 | 1/2014 |
| WO | WO2015/020868 | 2/2015 |

OTHER PUBLICATIONS

International Search Report and Written Opinion for International Patent Application No. PCT/US2016/029866, dated Aug. 11, 2016.

(Continued)

*Primary Examiner* — Rexford N Barnie
*Assistant Examiner* — David A Shiao
(74) *Attorney, Agent, or Firm* — Webster Rosselli & Cannon LLP

(57) ABSTRACT

A power supply system includes an energy storage device electrically connected to a power grid, a power distribution assembly electrically connected to a load, and a power generation device electrically connected to the power distribution assembly. The energy storage device and the power grid are configured to supply electric power having a first voltage range to the power distribution assembly, which in turn, is configured to supply electric power having a second voltage range less than the first voltage range to the load. The energy storage device and the power generation device each are configured to at least temporarily supply a flow of electric power to the power distribution assembly when electric power from the power grid is interrupted such that a substantially uninterrupted flow of electric power is supplied to the load.

20 Claims, 4 Drawing Sheets

(56) References Cited

U.S. PATENT DOCUMENTS

| | | | | |
|---|---|---|---|---|
| 10,033,220 | B1* | 7/2018 | Nguyen | H02J 9/06 |
| 2002/0014802 | A1* | 2/2002 | Cratty | H02J 1/06 |
| | | | | 307/43 |
| 2005/0200205 | A1 | 9/2005 | Winn et al. | |
| 2006/0061334 | A1* | 3/2006 | Pollack | H02J 9/066 |
| | | | | 322/4 |
| 2008/0088183 | A1 | 4/2008 | Eckroad et al. | |
| 2009/0019137 | A1 | 1/2009 | Mishra et al. | |
| 2009/0019535 | A1 | 1/2009 | Mishra et al. | |
| 2010/0207463 | A1 | 8/2010 | Fortmann et al. | |
| 2014/0152109 | A1 | 6/2014 | Kanakasabai et al. | |
| 2014/0368043 | A1* | 12/2014 | Colombi | H02J 9/062 |
| | | | | 307/66 |
| 2015/0035358 | A1 | 2/2015 | Linkhart et al. | |
| 2015/0188362 | A1* | 7/2015 | Mondal | H02M 3/156 |
| | | | | 307/52 |
| 2016/0294188 | A1* | 10/2016 | Stiefenhofer | H01R 31/06 |

OTHER PUBLICATIONS

S&C Electric Co., "Solutions for Data Centers," 2015 [retrieved on Mar. 14, 2015] Retrieved from the Internet <URL: http://www.sandc.com/solutions/data-centers.asp>, 1 pg.

Miller, Troy, "Smart grid solutions for data centers (can you say "self-healing?")," 2013 [retrieved on May 6, 2015] Retrieved from the Internet <URL: http://www.smartgridnews.com/story/smart-grid-solutions-data-centers-can-you-say-self-healing/2013-10-16>, 2 pgs.

Clark, Jeff, "Raising Data Center Power Density," 2013 [retrieved on Jan. 23, 2017] Retrieved from the Internet <URL: http://www.datacenterjournal.com/raising-data-center-power-density/>, 5 pgs.

\* cited by examiner

DEVICES AND METHODS FOR RELIABLE POWER SUPPLY FOR ELECTRONIC DEVICES

CROSS-REFERENCE TO RELATED APPLICATIONS

This application claims priority to and the benefit of U.S. Provisional Patent Application Ser. No. 62/153,848 entitled, "Devices and Methods for Reliable Power Supply for Electronic Devices," filed Apr. 28, 2015, the disclosure of which is incorporated herein by reference in its entirety.

BACKGROUND

The embodiments described herein relate generally to delivering reliable electric power to electronic devices and more particularly, to devices and methods for improving electric components configured to provide uninterrupted and/or reliable electric power to electronic devices to mitigate the effects of power grid irregularities.

Reliable electric power systems are increasingly sought to provide uninterrupted electric power to electronic devices during power grid interruptions, irregularities, and/or outages. In some instances, electronic equipment can perform tasks of such importance that interruption of the electric power delivered thereto can result in substantial negative consequences. For example, power interruption to electric and/or electronic equipment included in a hospital, data center, and/or the like can lead to large-scale impacts on patient's health, safety, commerce, etc.

Electrical power failures, interruptions, and/or faults can be caused by a large number of factors, including equipment failure, supply capacity, power surge, and/or the like. To mitigate the effects of power interruption or irregularity, electric power supply devices downstream of the power grid (e.g., back-up power systems and/or the like) can be used to provide electric power during a power grid interruption and/or irregularity. For example, in some instances, a local electric power supply (e.g., a data center one-line) can include batteries, capacitors, generators, uninterruptible power supplies (UPSs), and/or the like. As the complexity of the electrical load to which electric power is supplied increases, the need for local power systems with higher capacity and/or complexity similarly increases. As such, local power systems can form complex electric circuits, which are often difficult to repair, scale, upgrade, and/or the like. For example, some local power systems configured to supply electric power to a data center or the like, include multiple low voltage UPSs that supply electric power to the electronic devices (e.g., servers), cooling systems, and/or the like, and include at least one medium voltage generator that supplies power to the low voltage UPSs in the event of a power grid interruption. Such arrangements can lead to uneven load balancing, can be relatively inefficient, and/or can have choke points or the like that can result in some components being used to capacity while other components are underutilized. Moreover, some known power systems and/or components thereof are deployed and/or housed within a facility that can result in the use of space within a facility (e.g., a data center), which could otherwise be used for value-added equipment.

Thus, a need exists for improved devices and methods for improving electric components configured to provide back-up electric power.

SUMMARY

Devices and methods for optimizing and/or improving electric components configured to provide back-up electric power are described herein. In some embodiments, a power supply system includes an energy storage device, a power distribution assembly, and a power generation device. The energy storage device is associated with a first voltage range and is configured to be electrically connected to a power grid and a load. The energy storage device is configured to transition between a first configuration, in which electric power flows between the power grid and the load, and a second configuration, in which a flow of electric power between the power grid and the load is interrupted. The power distribution assembly is configured to receive a flow of electric power having a voltage within the first voltage range from at least one of the power grid or the energy storage device. The power distribution assembly is also configured to supply a flow of electric power having a voltage within a second voltage range less than the first voltage range to the load. The power generation device is associated with the second voltage range and is electrically connected to the power distribution assembly. The power generation device is configured to transition from a first mode to a second mode when the energy storage device transitions from the first configuration to the second configuration. The power generation device and the energy storage device each are configured to at least temporarily supply a flow of electric power to the power distribution assembly when the energy storage device is in the second configuration and the power generation device is in the second mode such that the power distribution assembly supplies a substantially uninterrupted flow of electric power having a voltage within the second voltage range to the load.

DETAILED DESCRIPTION

Figure 1:
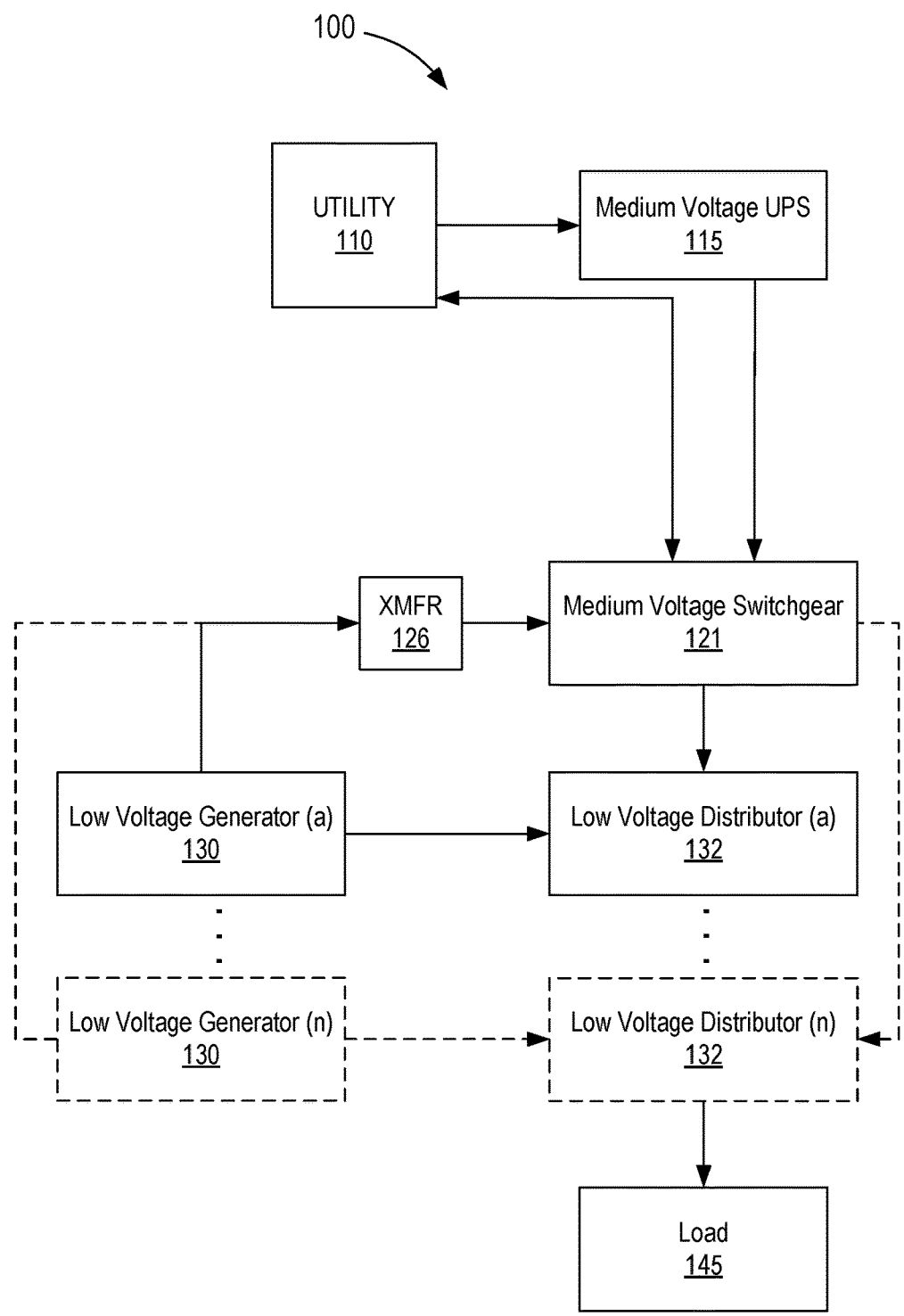
FIG. 1 is a schematic block diagram of an electric power system according to an embodiment.

In some embodiments, a power supply system includes an energy storage device, a power distribution assembly, and a power generation device (e.g., a power generator). The energy storage device is associated with a first voltage range and is configured to be electrically connected to a power grid and a load. The energy storage device is configured to transition between a first configuration, in which electric power flows between the power grid and the load, and a second configuration, in which a flow of electric power between the power grid and the load is interrupted. The power distribution assembly is configured to receive a flow of electric power having a voltage within the first voltage range from at least one of the power grid or the energy storage device. The power distribution assembly is also configured to supply a flow of electric power having a voltage within a second voltage range less than the first voltage range to the load. The power generation device is associated with the second voltage range and is electrically connected to the power distribution assembly. The power generation device is configured to transition from a first mode to a second mode when the energy storage device transitions from the first configuration to the second configuration. The power generation device and the energy storage device are each configured to at least temporarily supply a flow of electric power to the power distribution assembly when the energy storage device is in the second configuration and the power generation device is in the second mode such that the power distribution assembly supplies a substantially uninterrupted flow of electric power having a voltage within the second voltage range to the load.

In some embodiments, a power supply system includes an energy storage device associated with a first voltage range and a power generation device associated with a second voltage range less than the first voltage range. The energy storage device is configured to be electrically connected to a power grid to allow a flow of electric power between the power grid and the energy storage device. The power grid and the energy storage device are each configured to be electrically connected to a load via at least one electric circuit. The power generation device is configured to be electrically connected to the at least one electric circuit at a position between the load and the energy storage device. The power generation device is configured to transition from a first configuration to a second configuration to supply a flow of electric power to the load in response to a flow of electric power from the power grid meeting a criterion. The energy storage device is configured to at least temporarily supply a flow of electric power to the load as the power generation device transitions from the first configuration to the second configuration such that the load receives a substantially uninterrupted flow of electric power having a having a voltage within the second voltage range.

In some embodiments, a method includes electrically connecting an uninterruptible power supply (UPS) associated with a medium voltage range to a power grid. A first portion of a switchgear assembly is electrically connected to the UPS and the power grid. The first portion of the switchgear assembly is configured to receive a flow of electric power having a voltage within the medium voltage range from at least one of the power grid or the UPS. At least one generator is electrically connected to a second portion of the switchgear assembly. The at least one generator is configured to selectively supply a flow of electric power having a voltage within a low voltage range to the second portion of the switchgear assembly. The second portion of the switchgear assembly is electrically downstream of the first portion of the switchgear assembly (e.g., relative to the energy storage device and/or such that electric power flows from the first portion the second portion) such that the at least one generator is electrically downstream of the UPS. The second portion of the switchgear assembly is electrically connected to a load and is configured to supply a flow of electric power having a voltage within the low voltage range to the load.

In some embodiments, a power supply system such as a data center one-line is in electric communication with a power grid source and is configured to supply a flow of electric power to a load. The power supply system includes at least a first power source (e.g., a medium voltage uninterruptible power supply) and a second power source (e.g., one or more low voltage generators, one or more medium voltage generators, etc.). The first power source is configured to be associated with a higher voltage than or equal to the second power source. The power supply system is configured to transition between a first configuration, in which the power grid supplies a flow of electric power to the power supply system, and a second configuration, in which the flow of electric power from the power grid is interrupted. The first power source is configured to receive a flow of electric power from the power grid source operable in energizing the first power source when the power supply system is in the first configuration. The first power source and the second power source are configured to at least temporarily supply a flow of electric power to the load when the power supply system is in the second configuration.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "electric" and "electrical" are interchangeable. For example, the terms "electric power" and "electrical power" are each intended to refer to energy associated with a flow of electricity. Similarly, the term "electric component" and "electrical component" are each intended to refer to a component configured to receive a flow of electricity.

As used herein, the terms "feedback" and/or "feedback loop" relate to a system wherein past or present characteristics influence current or future actions. For example, a power distribution system is said to be a feedback system when the state of the system (e.g., an electric circuit in an "open" configuration or a "closed" configuration) is dependent on one or more inputs fed back to a controller. Feedback systems can be controlled and/or implemented in a number of ways. For example, a feedback system can be an electromechanical system including a number of relays, switches, or the like which can open or close an electric circuit based on a signal received from a sensor, a flow or a direction of flow of electricity, and/or the like. In some instances, a feedback system can be controlled and/or implemented in a programmable logic controller (PLC) that can use control logic to perform one or more actions based on an input from a system component, a state of an electric circuit, and/or a flow of electric power. For example, an electronic device (e.g., a computer) can include memory configured to store instructions or logic that are/is executed in a processor, which in turn, can cause a system component and/or an electric circuit to transition to a desired state or the like.

In some instances, PLCs implement feedback systems to actively control electromechanical systems in order to achieve and/or maintain a desired system state. In some instances, a feedback system can be implemented to control one or more characteristics associated with a flow of electric power. By way of example, one or more sensors in such a feedback system can determine current and/or past states associated with a flow of electric power and can return the current and/or past state values to the PLC. Thus, based on the current and/or past state values, the PLC controller can, for example, open or close an electric circuit, energize a switch mechanism, power on or power off a device, actuate a generator and/or uninterruptible power supply, and/or perform any other suitable control process.

In some instances, a PLC can include a control scheme such as, for example, a proportional-integral-derivative (PID) controller, which is stored in memory and implemented in a processor. Expanding further, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system. In some instances, an electronic device can implement any suitable numerical method or any combination thereof (e.g., Newton's method, Gaussian elimination, Euler's method, LU decomposition, etc.). Thus, based on the past and/or current state of the one or more components, an electric and/or electromechanical system can be actively changed to achieve, for example, a desired system state (e.g., a desired electric state).

As used herein, the terms "low voltage" or "low voltage range," "medium voltage" or "medium voltage range," and "high voltage" or "high voltage range" are used to describe a value and/or magnitude (or range of values and/or range of magnitudes) of electrical potential energy between two points. For the purposes of this application, the terms "low voltage" and/or "low voltage range" describe a voltage or range of voltages below about 600 volts (V) (e.g., about 480 V). The terms "medium voltage" and/or "medium voltage range" describe a voltage or a range of voltages above about 600 V and below about 69,000 V (69 kilovolts (kV)) (e.g., between about 2.4 kV and about 69 kV). The terms "high voltage" and/or "high voltage range" describe a voltage above about 69 kV (e.g., between about 115 kV and about 230 kV). Some electrical devices and/or electrical components described herein can be rated for a given amount or magnitude of voltage as well as a given amount of current (i.e., a flow of an electric charge). In other words, some of the electrical devices and/or electrical components can be designed to accept, consume, use, switch, and/or otherwise operate under a given electrical power and/or within a given range of electric power. Electrical power (P) is a measure of a rate of work done by electric energy and is the product of voltage (V) times current (I), typically expressed in watts (W). Thus, under substantially constant current, an increase or decrease in voltage can result in an associated increase or decrease, respectively, in electric power.

As used herein, the terms "downstream" and "upstream" refer, for example, to a position of an electric and/or electronic component relative to a flow of electric power. In some instances, a position of an electric component along an electric circuit can be relative to a load or a power source. By way of example, a first electric component can be electrically connected to a power source and a second electric component can be electrically connected between the first electric component and a load. Thus, in a configuration in which the power source provides a flow of electric power, the first electric component can be referred to as "upstream" of the second electric component, while the load can be referred to as "downstream" of the first electric component and the second electric component. In some instances, a flow of electric power can be reversed such that a component that was referred to as "downstream" supplies a flow of electric power to a component that was referred to as "upstream." Thus, when defining a position of an electric component along an electric circuit, the terms "downstream" and "upstream" are dependent on a flow of electric power and describe a position relative to a reference component, source, and/or load. Moreover, the terms "downstream" and "upstream" can refer to either an electrical position or a physical position. For example, a first electric component physically disposed closer to a load can be referred to as being downstream of a second electric component physically disposed further from the load even if the configuration of the electric circuit is such that the first electric component is electrically isolated from the second electric component (e.g., based on a configuration of a switch or the like).

The embodiments described herein can be used to provide substantially continuous and/or reliable electric power to electronic devices despite interruptions, irregularities, and/or failures of a power grid. Specifically, in some embodiments, the systems and methods described herein can be used to supply electric power to electronic and/or electric devices included in a data center. Data centers often include a large number of electronic devices (i.e., servers, server blades, routers, and/or switches) for which uninterrupted electric power is desirable. The operation of the electronic devices in a data center produces heat and thus, data centers typically having cooling systems, for which uninterrupted electric power is also desirable. In some instances, portions of a power system are installed and/or disposed within the data center and thus, occupy space that could otherwise be used for additional electronic devices. Moreover, the portions of the power system also release undesirable heat, which in turn, reduces utilization of the data center.

Power systems for data centers generally receive electric power from a power grid and supply and/or distribute the electric power to the electric and/or electronic components in the data center (e.g., servers, server blades, routers, switches, workstations, etc.). In some data center implementations, such power systems include at least one medium voltage generator and a number of low voltage UPSs, switchgears (e.g., switches, fuses, circuit breakers, etc.), transformers, and power distribution units (PDU) to deliver electric power to the data center. In some implementations, the low voltage UPSs can be rated at and/or are configured to output electric power at about 480 V and server equipment can be configured to receive electric power, for example, at about 208 V. Thus, the transformers and/or PDUs can transform, convert, and/or down-step the voltage output by the low voltage UPSs. When the power system receives electric power from the power grid, the medium voltage generator can be in an "off" state or mode (i.e., not generating electric power); however, when the electric power from the power grid is interrupted, the low voltage UPSs can provide uninterrupted electric power to the data center while the medium voltage generator transitions to an "on" state or mode and begins to output electric power. In contrast to a system with a low voltage UPS and a medium voltage generator, the power systems described herein include at least one medium voltage UPS and at least one low voltage generator, which in turn increases efficiency, modularity, electrical density (e.g., watts per square foot (w/sq. ft.)), and reliability, and reduces the power system footprint and cost. By using a medium voltage UPS and at least one low voltage generator disposed downstream of the medium voltage UPS relative to the load and/or physically disposed closer to the load, any suitable number of power modules can be added to or removed from the medium voltage UPS associated with a larger portion of a load, which is otherwise inhibited by using a low voltage UPS specific to only a predetermined smaller portion of the load. Such a medium voltage UPS also increases the utilization of the UPS since the UPS can be associated with a greater portion of the load, thus reducing stranded capacity and increasing the flexible density since the UPS can be used across a greater portion of the load. Moreover, in instances in which a fault occurs between a UPS and a generator (e.g., a fault within switchgear), placing, for example, at least one generator closer to the load than, for example, a UPS, can be such that the at least one generator powers the load for an indefinite time period, which can be greater than a time otherwise associated with at least one UPS being disposed closer to the load and providing power thereto in the event of a fault. In addition, the power systems described herein can facilitate load sharing, balancing, and reconfiguration, as described in further detail herein.

FIG. 1 is a schematic block diagram of a power system 100 according to an embodiment. In this embodiment, the power system 100 can be configured to receive electric power from a power utility 110 (e.g., a power plant, substation, transmission line, and/or generally, a power grid) and to deliver at least a portion of the electric power to, for example, a data center. In other embodiments, the power system 100 can be used to deliver power to any suitable facility such as a hospital, medical center, and/or the like. As shown in FIG. 1, the power system 100 includes a medium voltage UPS 115, a medium voltage switchgear 121, at least one low voltage generator 130, a transformer 126 (shown in FIG. 1 as "XMFR"), at least one low voltage distributor 132 (e.g., a switch), and a load 145. The load 145, in this embodiment, is the data center and more specifically, at least the electronic devices (e.g., servers) included therein.

The medium voltage UPS 115 can be any suitable uninterruptible power supply and/or energy storage device configured to receive, store, output, and/or otherwise operate at a medium voltage and/or within a medium voltage range. For example, in some embodiments, the medium voltage UPS 115 can be substantially modular, wherein adding one or more power modules increases an operating voltage and/or capacity of the medium voltage UPS 115. For example, in some embodiments, a power module can be rated to provide about 2.25 MW of electric power and one or more power modules can be added or removed based on the load of the data center. In some embodiments, the medium voltage UPS 115 can be configured to operate within a medium voltage range between about 1 kV to about 30 kV. In some embodiments, the medium voltage UPS 115 can be configured to operate within a medium voltage between about 4.16 kV and about 15 kV. In some embodiments, the medium voltage UPS 115 can be a PureWave® UPS manufactured by S&C Engineering Co., Chicago, Ill. In other embodiments, the medium voltage UPS 115 can be a PCS 100 MV UPS manufactured by ABB LTD, Zurich, Switzerland. In yet other embodiments, the medium voltage UPS 115 can be any suitable UPS configured to operate and/or store a medium voltage.

The medium voltage switchgear 121 is electrically connected to the utility 110, the medium voltage UPS 115, the transformer 126, and the low voltage distributor(s) 132. The medium voltage switchgear 121 can be any suitable switch, switchgear, circuit breaker, buss, fuse block, panel board, distributor and/or the like. Although the medium voltage switchgear 121 is shown in FIG. 1 as being a single switch, in other embodiments, the medium voltage switchgear 121 can be one or more switchgears and/or switch circuits arranged in any suitable electrical configuration (e.g., series, parallel, and/or a combination thereof). The medium voltage switchgear 121 is configured to receive a flow of electric power from one or more of the utility 110, medium voltage UPS 115, and/or the low voltage generator(s) 130 (e.g., via the transformer 126) and to direct a flow of at least a portion of the electric power to the load 145 via the low voltage distributor(s) 132. More specifically, the medium voltage switchgear 121 can receive a flow of electric power having a medium voltage such as, for example, within the medium voltage range between about 4.16 kV and about 15 kV and in response, can deliver a flow of electric power to the low voltage distributor(s) 132.

Although not shown in FIG. 1, in some embodiments, the medium voltage switchgear 121 can be in electric communication with, can include, and/or can be included in a control device, control circuit, feedback control system, and/or the like. For example, in some embodiments, the power system 100 can include a controller such as a PLC or the like that is configured to control at least a portion of the power system 100 based on one or more states (e.g., electric states) of one or more electric components included therein. By way of example, a power system 100 can include an electronic device (not shown in FIG. 1) that includes at least memory and a processor. The processor included in the electronic device (e.g., a server, computer, laptop, tablet, mobile device, etc.) can be configured to execute a set of instructions or code stored in the memory and associated with a PLC control of the power system 100 (e.g., can send and/or receive signals associated with a feedback control system and/or the like such as a proportional-integral-derivative control scheme). Thus, based on a signal and/or electric power received from the PLC controller, the medium voltage switchgear 121 can open or close any suitable portion of an electric circuit to direct a desired portion of electric power delivered thereto. In addition, although not shown in FIG. 1, the medium voltage switchgear 121 can be electrically connected to and/or can include a transformer or the like configured to reduce a voltage associated with an output of electric power such that the low voltage distributor(s) 132 receives a flow of electric power, having a low voltage, from the medium voltage switchgear 121.

The power system 100 can include any suitable number of low voltage distributors 132 (also referred to herein as "distributor(s)"). The distributor(s) 132 can be any suitable switch, switchgear, circuit breaker, buss, fuse block, and/or the like. In some embodiments, the distributor(s) 132 can be power distribution units, blocks, assemblies, etc. In some embodiments, the low voltage distributors 132 can be a switchgear, which can be substantially similar to the medium voltage switchgear 121, yet configured to receive and/or distribute a flow of electric power having a voltage within the low voltage range (e.g., below 600 V). As shown in FIG. 1, each distributor 132 is in electric communication with the medium voltage switchgear 121, at least one low voltage generator 130, and the load 145. Thus, in some instances, each low voltage distributor 132 can be configured to receive electric power from the medium voltage switchgear 121 and can be configured to distribute at least a portion of the electric power to any suitable portion of the load 145. In other instances, each low voltage distributor 132 can be electrically connected to and receive electric power from a different low voltage generator 130. That is to say, in some embodiments, a single low voltage generator 130 can be electrically connected to an associated (i.e., one) low voltage distributor 132, as shown in FIG. 1.

Although not shown in FIG. 1, in some embodiments, the power system 100 can include one or more transformers electrically connected between the distributor(s) 132 and the medium voltage switchgear 121 such that each distributor 132 receives a flow of electric power having a low voltage and/or a voltage within the low voltage range. In other embodiments, the low voltage distributors 132 can include a transformer or the like configured to step-down a voltage associated with a flow of electric power received from the medium voltage switchgear. Although not shown, each distributor 132 can be in electric communication with a controller or the like such as the PLC controller described above. In some embodiments, one or more medium voltage switchgear devices 121, one or more transformers, and/or one or more distributors 132 can be included in a single device and/or assembly. Such an assembly can be, for example, a power distribution assembly, a switchgear assembly, and/or any other suitable device or combination of devices. In some embodiments, for example, the medium voltage switchgear 121 can be included in and/or can form a first portion of a switchgear assembly and the distributor 132 can be included in and/or can form a second portion of the switchgear assembly. Such a switchgear assembly can include, for example, a transformer that is included in and/or forms a third portion of the switchgear assembly. In other embodiments, a transformer or the like can be integrated into the first portion and/or the second portion.

As shown in FIG. 1, the power system 100 can include any suitable number of low voltage generators 130. In some instances, the low voltage generators 130 can be substantially modular, which in turn, can allow for the addition or removal of one or more low voltage generators 130 based on an amount of electric power associated with the operation of the load 145. For example, in some embodiments, the power system 100 can include one low voltage generator 130 electrically connected to one low voltage distributor 132. In other embodiments, a power system can include two, three, four, five, six, seven, eight, nine, ten, fifteen, twenty or more low voltage generators 130, each of which is electrically connected to a different low voltage distributor 132. In still other embodiments, a power system can include any number of low voltage generators electrically connected to any number of low voltage distributors. Moreover, the low voltage generators 130 can be electrically connected to the medium voltage switchgear 121 via the transformer 126. For example, each low voltage generator 130 can be electrically connected to the transformer 126, which can be configured, for example, to step-up and/or otherwise increase a voltage associated with a flow of electric power and, in turn, can deliver a flow of electric power, having a medium voltage and/or a voltage within the medium voltage range, to the medium voltage switchgear 121. In other embodiments, each low voltage generator 130 can be electrically connected to a different transformer 126, each of which, in turn, are electrically connected to the medium voltage switchgear 121.

The low voltage generators 130 can be configured to operate within a low voltage such as, for example, below 600 V. In some embodiments, the low voltage generators 130 can be configured to operate at and/or otherwise output a low voltage at about 480 V. In some embodiments, a power system can include more than one low voltage generator 130, which can be electrically coupled such that an electric power output by each low voltage generator 130 is cumulative (e.g., coupled in series). As described above, during normal operation of the power system 100 (e.g., when the utility 110 is supplying a desired amount of electric power), the low voltage generators 130 can be in an "off" operational state and/or mode. When a flow of electric power from the utility 110 becomes irregular and/or is interrupted, the low voltage generators 130 can be transitioned (e.g., by a controller or the like) to an "on" operational state and/or mode, in which the low voltage generators 130 supply a flow of electric power to the load 145, as described in further detail herein.

In some embodiments, the arrangement of the power system 100 is such that each electric component included therein (except for the utility 110) is downstream of the medium voltage UPS 115 relative to the utility 110 when the utility 110 is supplying a flow of electric power. In other words, each electric component included in the power system 100 other than the utility 110, can at least indirectly receive electric power from the medium voltage UPS 115 and/or is disposed at a physical position closer to the load than the medium voltage UPS 115. In some embodiments, such an arrangement can allow for increased flexibility of the power system 100 by increasing or decreasing a number of power modules included in the medium voltage UPS 115, than an amount of flexibility otherwise associated with a low voltage UPS arrangement. Such an arrangement also places the low voltage generators 130 closer to the load 145, which in turn, can increase efficiency, modularity, and reliability. Moreover, in some embodiments, the use of the medium voltage UPS 115 can be such that electric power with a higher voltage is delivered to at least a portion of the power system 100. Thus, with electric power being the product of voltage times current, the amount of current associated with a predetermined electric power can be reduced, which in turn, can reduce the size and/or the amount of conductors (e.g., copper wire) used to supply the electric power to the load 145.

As described above, the low voltage generators 130 can be in the "off" operational state and/or mode when the utility 110 is delivering a flow of electric power to the load 145 and can be transitioned to the "on" operational state and/or mode to supply a flow of electric power to the load 145 when the flow of electric power from the utility 110 becomes irregular and/or is interrupted. In such instances, the medium voltage UPS 115 can supply electric power to the load 145 (e.g., via the medium voltage switchgear 121 and the distributor(s) 132) while the low voltage generators 130 are being transitioned from the "off" to the "on" operational state and/or mode. That is to say, the medium voltage UPS 115 can discharge electric power stored by the medium voltage UPS 115 until the low voltage generators 130 are outputting sufficient electric power. Once the low voltage generators 130 are generating a desired electric power, the power system 100 can be configured to transition to an operational state and/or mode in which the low voltage generators 130 supply, for example, at least a portion of the generated electric power to the load 145 (e.g., via the medium voltage switchgear 121 and the distributor(s) 132). Thus, the low power system 100 can provide electric power to the load 145 during, for example, an interruption, fault, and/or failure associated with the utility 110.

In some instances, the power system 100 can be configured to balance the load 145 and/or to provide electric power to the utility 110 (e.g., the power grid). For example, in some instances, the power system 100 can include a controller such as a PLC (described above), which can be configured to execute a set of instructions, code, and/or processes that can transition the low voltage generators 130 from the "off" operational state and/or mode to the "on" operational state and/or mode while the flow of electric power from the utility 110 is stopped (e.g., in a predetermined manner and/or intentionally stopped or reduced). As described above, the medium voltage UPS 115 can be configured to discharge electric power stored by the medium voltage UPS 115 when the utility 110 stops supplying electric power and as the low voltage generators 130 are transitioned to the "on" operational state and/or mode (e.g., during predetermined time periods such as peak power use for the utility 110). In some instances, when the low voltage generators 130 are in the "on" operational state and/or mode and are supplying at least a first portion of the generated power to the load 145, the power system 100 can transition to a configuration (e.g., via a transition of an operational state of the distributor 132, the medium voltage switchgear 121, and/or the like) in which a second portion of the generated electric power is supplied to the utility 110.

More specifically, the low voltage generators 130 can supply a flow of electric power at a low voltage (e.g., about 480 V) and/or within the low voltage range to the transformer 125, which in turn, can be configured to transform the electric power to a flow of electric power at a medium voltage and/or within the medium voltage range. For example, the transformer 125 can be a step-up transformer that can increase a voltage associated with a flow of electric power therethrough. As such, the first portion of the generated electric power (e.g., 50% of the electric power and/or any other portion of the electric power) can be supplied to the load 145 at about the low voltage, while the second portion of the generated electric power (e.g., 50% of the electric power and/or any other remaining portion) can be supplied to the utility 110 at about the medium voltage. Similarly, in some instances, a third portion of the generated electric power can be supplied (e.g., at the medium voltage) to the medium voltage UPS 115. In other instances, the medium voltage UPS 115 and the low voltage generators 130 can provide electric power to the utility 110. For example, the medium voltage UPS 115 can be configured to store electric power for the utility 110 and, in some instances, can be configured to supply at least a portion of the stored electric power back to the utility 110. As such, a net electric power consumed by the load 145 over a given time can be reduced and an amount of electric capacity otherwise stored in the medium voltage UPS 115 and/or otherwise not used by the power system 100 can be provided to the utility 110, as described in greater detail herein.

Figure 2:
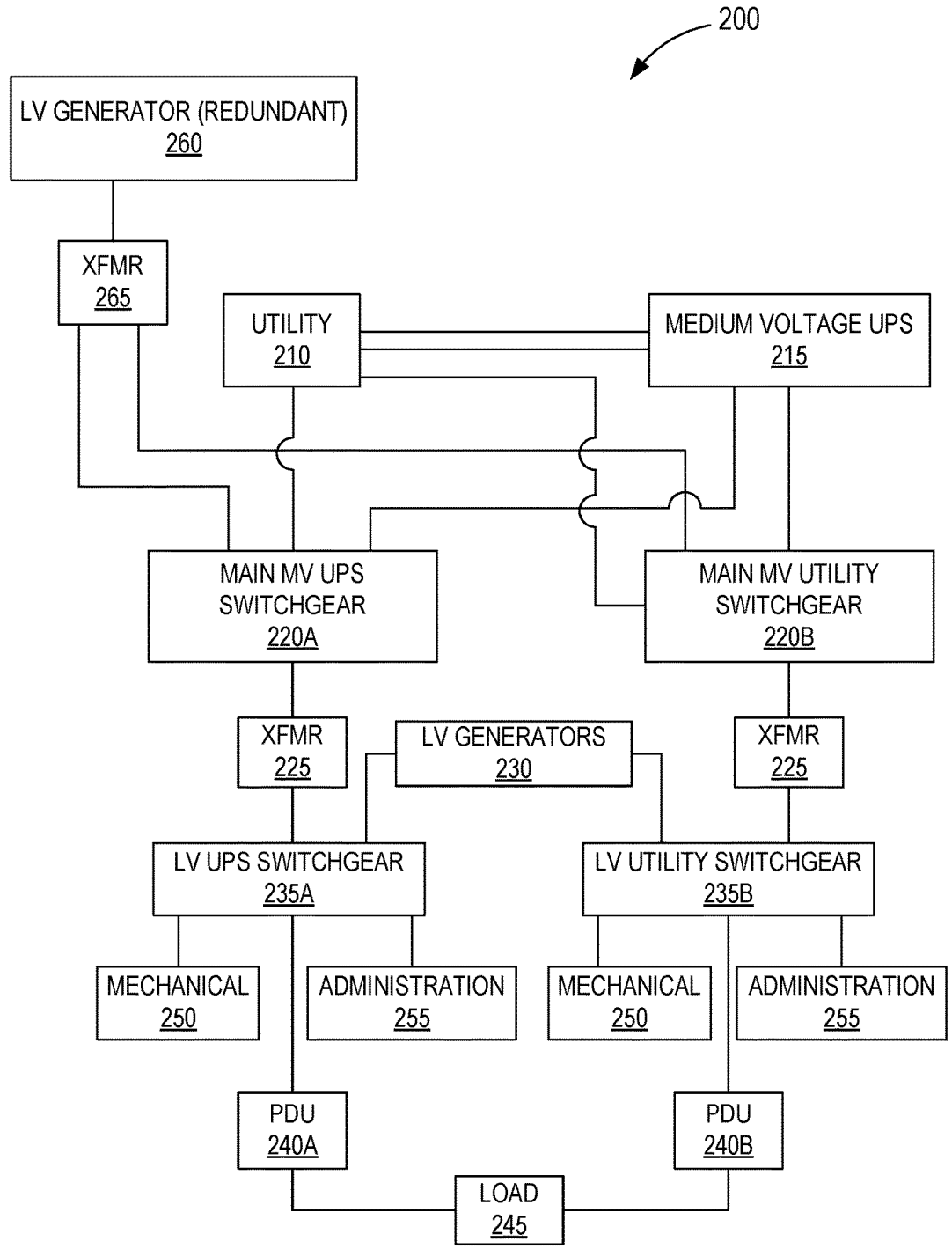
FIG. 2 is a schematic block diagram of an electric power system according to another embodiment.

FIG. 2 is a schematic block diagram of a power system 200 according to an embodiment. In this embodiment, the power system 200 can be configured to receive electric power from a power utility 210 (e.g., a power plant, substation, transmission line, and/or generally, a power grid) and to deliver at least a portion of the electric power to a load 245. The load 245, in this embodiment, can be a data center and more specifically, at least the electronic devices (e.g., servers, server blades, switches, and/or routers) included therein. In some embodiments, the load 245 can also include, and/or the power system 200 can also supply electric power to, mechanical equipment 250 and administration equipment 255. The mechanical equipment 250 can be, for example, a chiller system configured to cool the servers included in the data center, a heating/venting/air conditioning (HVAC) system (distinct from the chiller system), and/or the like. The administration equipment 255 can be, for example, workstations, lights, etc. While described as supplying electric power to a data center, in other embodiments, the power system 200 can be used to deliver power to any other facility, such as a hospital, medical center, and/or the like, that includes electrical equipment configured to receive uninterrupted electric power.

The power system 200 includes a medium voltage uninterruptible power supply 215, medium voltage switchgear 220A and 220B, transformers 225, low voltage generators 230, low voltage switchgear 235A and 235B, power distribution units (PDU) 240A and 240B, and a load 245. In addition, the power system 200 can include a redundant low voltage generator 260 and an associated transformer 265. Although not shown in FIG. 2, in some embodiments, the power utility 210 (e.g., the power grid) can be associated with high voltage and/or high voltage range (e.g., greater than 115 kV) and as such, the power system 200 can include and/or can be electrically connected to any suitable electrical component configured to step-down the electric power prior to being provided to the other components of the power system 200 such as a step-down transformer, a PDU, and/or the like. In such embodiments, the power utility 210 can provide a flow of medium voltage electric power (e.g., within a medium voltage range between about 4.16 kV and about 30 kV) to the power system 200. In other embodiments, the power utility 210 can provide any other suitable level of voltage.

The medium voltage uninterruptible power supply 215 (also referred to herein as "medium voltage UPS" or "MVUPS") can be any suitable uninterruptible power supply and/or energy storage device that is configured to receive, store, output, and/or otherwise operate within a medium voltage range. In some embodiments, the MVUPS 215 can be configured as and/or can include a capacitor, supercapacitor, ultracapacitor, and/or any other electric, chemical, or kinetic energy storage device. As such, the MVUPS 215 can store potential energy that can be later discharged as electric power. For example, in some instances, the MVUPS 215 can be configured to receive a flow of electric power from the utility 210, to store an amount of the electric power as potential energy (e.g., potential chemical energy in a chemical battery, or potential/kinetic mechanical energy in a flywheel, later converted to electric energy), and to supply a flow of electric power to the power system 200. In this manner, the MVUPS 215 can supplement, condition, replace, and/or augment the electric power received from the utility 210 to mitigate the effects of power irregularities, interruptions, failures, etc. associated with the utility 210.

In some instances, the MVUPS 215 can be configured to store electric power for the utility 210 and can supply a flow of electric power back to the utility 210. For example, although not shown, the power system 200 can include a control device, control circuit, relay logic, feedback control system, and/or the like. In some embodiments, the power system 200 can include a controller such as a PLC or the like that is configured to control at least a portion of the power system 200 based on one or more states (e.g., electric states) of one or more electric components included therein. By way of example, a power system 200 can include an electronic device (not shown in FIG. 2) that includes at least a memory and a processor. The processor included in the electronic device (e.g., a server, computer, laptop, tablet, mobile device, etc.) can be configured to execute a set of instructions or code stored in the memory and associated with a PLC control of the power system 200 (e.g., can send and/or receive signals associated with a feedback control system and/or the like such as a proportional-integral-derivative control scheme). In this manner, the PLC can be operable in changing one or more operating conditions of the MVUPS 215 and, as a result, the MVUPS 215 can supply a flow of electric power to the utility 210, as described in further detail herein.

As described above, the MVUPS 215 (e.g., medium voltage energy storage device) is configured to receive, store, output, and/or otherwise operate at a medium voltage and/or within a medium voltage range. In some embodiments, the MVUPS 215 can operate within a medium voltage range between about 2 kV to about 30 kV. In other embodiments, the MVUPS 215 can operate within a medium voltage range between about 3 kV and about 25 kV. In still other embodiments, the MVUPS 215 can operate within a medium voltage range between about 4.16 kV and about 15 kV. In some embodiments, the medium voltage UPS 215 can be substantially modular. As such, adding one or more power modules increases an operating voltage (or voltage range) and/or capacity of the MVUPS 215. In some embodiments, each power module in the MVUPS 215 can be associated with an amount of electric power such as, for example, 250 kilowatts (kW), 500 kW, 750 kW, 1,000 kW (1.0 megawatts (MW)), 1.25 MW, 1.5 MW, 1.75 MW, 2.0

MW, 2.25 MW, or any other suitable amount. Moreover, the MVUPS 215 can include one power module, two power modules, three power modules, four power modules, five power modules, six power modules, seven power modules, eight power modules, nine power modules, ten power modules, eleven power modules, or more. In one embodiment, for example, the MVUPS 215 can include eleven power modules, each of which is associated with 2.25 MW. Thus, in that embodiment, the MVUPS 215 can be associated with (e.g., can receive, store, output, etc.) about 25 MW of electric power. In some embodiments, the medium voltage UPS 215 can be a PureWave® UPS manufactured by S&C Engineering Co., Chicago, Ill. In other embodiments, the medium voltage UPS 215 can be a PCS100 MV UPS manufactured by ABB LTD, Zurich, Switzerland. In yet other embodiments, the medium voltage UPS 215 can be any suitable UPS configured to operate and/or store a medium voltage.

As shown in FIG. 2, the power system 200 includes main medium voltage UPS switchgear 220A and main medium voltage utility switchgear 220B (collectively referred to as "medium voltage switchgears"). The medium voltage switchgears 220A and 220B can be any suitable switchgear, switchgear assembly, disconnect switch, circuit breaker, buss, fuse block, fault protector, panel board, distributor, distribution assembly, and/or the like. In some embodiments, the medium voltage switchgears 220A and 220B can receive a flow of medium voltage electric power from the utility 210 and/or the MVUPS 215 and can interrupt and/or isolate a fault current along a given circuit while maintaining service (e.g., electric power supply) to the remaining circuits unaffected by the fault. Thus, the medium voltage switchgears 220A and 220B can protect the electric components and/or the load 245 downstream of the medium voltage switchgears 220A and 220B when the switchgears 220A and 220B receive electric power from the utility 210 and/or the MVUPS 215. Moreover, in some embodiments, the arrangement of the medium voltage switchgears 220A and 220B can allow for both the utility 210 and the MVUPS 215 to supply a flow of electric power ultimately used by the load 245, as described in further detail herein.

Although not shown, in some embodiments, the medium voltage switchgears 220A and 220B can be in electric communication with, for example, the PLC (described above), which can be operable in changing one or more operating conditions associated with the medium voltage switchgears 220A and/or 220B. For example, the PLC can define a threshold value associated with an amount of voltage, current, electric power, etc., at which point the medium voltage switchgears 220A and/or 220B open or close an electric circuit, short-circuit one or more electric circuits, isolate one or more electric circuits, trip a circuit breaker and/or fuse, and/or the like. In some embodiments, the PLC can send a signal to the medium voltage switchgears 220A and 220B to cause the medium voltage switchgears 220A and 220B to balance the load 245 and/or the supply of electric power from the utility 210 and/or the MVUPS 215.

The medium voltage switchgears 220A and 220B are each electrically coupled to a different transformer 225 (represented in FIG. 2 as "XFMR 225"). One transformer 225 is, in turn, electrically coupled to a low voltage UPS switchgear 235A, while the other transformer 225 is, in turn, electrically coupled to a low voltage utility switchgear 235B (collectively referred to as "low voltage switchgears"). The transformers 225 can be, for example, step-down transformers or the like configured to reduce and/or step-down a voltage associated with a current flowing therethrough. More specifically, the medium voltage switchgears 220A and 220B are configured to output a flow of electric power having a medium voltage (e.g., 4.16 kV) and/or having a voltage within the medium voltage range (described above), while the low voltage switchgears 235A and 235B are configured to receive a flow of electric power having a low voltage (e.g., 480 V) and/or having a voltage within the low voltage range (described above). Thus, the transformers 225 can receive the flow of electric power having a voltage within the medium voltage range from the medium voltage switchgears 220A and 220B and can step-down the voltage such that the transformers 225 supply a flow of the electric power having a voltage within the low voltage range. The low voltage switchgears 235A and 235B can be substantially similar at least function to the medium voltage switchgears 220A and 220B, respectively, and can be configured to receive the low voltage from the transformers 225.

Although the transformers 225 are shown as being independent from and electrically coupled to the associated medium voltage switchgear 220A or 220B and the associated low voltage switchgear 235A or 235B, in other embodiments, the medium voltage switchgear 220A and/or 220B can include a transformer configured to reduce an output voltage therefrom. Similarly, the low voltage switchgear 235A and/or 235B can include a transformer configured to reduce an input voltage. In still other embodiments, a power system can include one or more switchgears, each of which is configured to receive an input of electric power having a medium voltage and output electric power having a low voltage. In other words, the medium voltage UPS switchgear 220A, the associated transformer 225, and the low voltage UPS switchgear 235A can be included in a single electrical component, device, assembly, circuit, and/or the like. In some embodiments, the medium voltage switchgear 220A can form and/or can be included in a first, medium voltage portion of a switchgear assembly, the low voltage switchgear 235A can form and/or can be included in a second, low voltage portion of the switchgear assembly, and, in some embodiments, the transformer 225 can form and/or can be included in a third, transfer portion of the switchgear assembly. Similarly, the medium voltage utility switchgear 220B, the associated transformer 225, and the low voltage utility switchgear 235B can be included in a single electrical component, device, assembly, circuit, and/or the like.

As shown in FIG. 2, the low voltage switchgears 235A and 235B are electrically coupled to, for example, the mechanical equipment 250, the administration equipment 255, and the PDUs 240A and 240B. Although not shown, the power system 200 can include any suitable transformer, power distribution unit, and/or the like configured to direct a portion of the electric power to the mechanical equipment 250 and/or the administration equipment 255. For example, in some embodiments, the power system 200 can include a transformer configured to step-down a voltage associated with a portion of the electric power supplied to the administration equipment 255 (e.g., down to 240 V, 120 V, and/or any other suitable voltage or voltage range). In some embodiments, the mechanical equipment 250 can include a chiller system and/or the like configured to receive a portion of the electric power without further reducing the voltage (e.g., configured to receive electric power at about 480 V). Although the mechanical equipment 250 and the administration equipment 255 are shown as being directly connected to low voltage switchgears 235A and/or 235B, in other embodiments, the low voltage switchgears 235A and 235B can be configured to supply a flow of the low voltage electric power to the PDUs 240A and 240B, respectively, which in turn, supplies a portion of the electric power to the mechanical equipment 250 and/or the administration equipment 255 at a desired voltage.

The PDUs 240A and 240B can be any suitable power distribution unit and/or assembly configured to supply a flow of the electric power to the load 245 at a desired voltage and/or within a desired voltage range. For example, the PDUs 240A and 240B are each configured to receive a flow of the low voltage electric power (e.g., at 480 V) from the associated low voltage switchgear 235A and 235B, respectively, and can distribute and/or direct at least a portion of the flow of the electric power having a desired voltage and/or a voltage within a desired voltage range to, for example, a number of server racks and/or the like included in the data center (i.e., the load). In some embodiments, the PDUs 240A and 240B can supply the load 245 with a flow of electric power having a voltage of, for example, about 208 V. In other words, the PDUs 240A and 240B can supply electric power having a voltage of, for example, about 208 V to each server rack and/or other server equipment (e.g., the individual servers, server blades, etc.). Thus, the utility 210 and/or the medium voltage UPS 215 can supply electric power to the load 245.

As shown in FIG. 2, the power system 200 can include any suitable number of low voltage generators 230 electrically coupled to the low voltage switchgears 235A and/or 235B. The low voltage generators 230 (e.g., an electric power generation device and/or the like) can be configured to produce electric power at a low voltage such as, for example, below 600 V and/or at a voltage within the low voltage range. In some embodiments, the low voltage generators 230 can be configured to operate at and/or otherwise output a low voltage at about 480 V. In some embodiments, the power system 200 can include more than one low voltage generator 230, which are each electrically coupled such that an electric power produced by each low voltage generator 230 is cumulative. In some instances, the low voltage generators 230 can be substantially modular, which in turn, can allow for the addition or removal of one or more low voltage generators 230 based on an amount of electric power associated with the operation of the load 245. For example, in some embodiments, the power system 200 can include one low voltage generator 230. In other embodiments, a power system can include two, three, four, five, six, seven, eight, nine, ten, fifteen, twenty, or more low voltage generators. Moreover, the arrangement of the power system 200 is such that each low voltage generator 230 is downstream of the MVUPS 215 when the utility 210 and/or the MVUPS 215 is supplying a flow of electric power and/or is positioned physically and/or electrically closer to the load 245 than the MVUPS 215. In some embodiments, such an arrangement can allow for an increased flexibility of the power system 200 by increasing or decreasing a number of power modules included in the medium voltage UPS 215, than an amount of flexibility otherwise associated with a low voltage UPS arrangement. Such an arrangement also places the low voltage generators 230 close to the load 245, which in turn, can increase efficiency and reliability and reduce the size and/or the amount of conductors (e.g., copper wire) used to supply the electric power to the load 245, as described above.

In some instances during operation of the power system 200 (e.g., when the utility 210 is supplying a desired amount of electric power), the low voltage generators 230 can be in an "off" operational state and/or mode. While the power system 200 is described above as receiving electric power from the utility 210, in some instances, the electric power from the utility 210 can be interrupted or irregular, and/or the utility 210 can have a power failure in which the utility 210 supplies substantially no electric power and/or an insufficient amount of electric power. In such instances, the low voltage generators 230 can be transitioned (e.g., by the PLC) to an "on" operational state and/or mode, in which the low voltage generators 230 supply a flow of electric power to the low voltage switch gears 235A and/or 235B. Moreover, while the low voltage generators 230 are being transitioned to the "on" operational state and/or mode, the medium voltage UPS 215 can supply the load 245 (including the mechanical equipment 250 and the administration equipment 255) with sufficient electric power such that the electric power is uninterrupted despite not receiving sufficient power from the utility 210. Once the low voltage generators 230 are in the "on" operational state and/or mode, the low voltage generators 230 and the MVUPS 215 can supply the load 245 with the desired electric power. In some instances, once the low voltage generators 230 are in the "on" operational state and/or mode, the low voltage generators 230 can supply electric power to the load 245 and the MVUPS 215, which in turn, energizes the MVUPS 215 (e.g., recharges). That is to say, once the low voltage generators 230 are transitioned to the "on" operational state and/or mode, the low voltage generators 230 can supply sufficient electric power to the load 245 without the MVUPS 215.

Although the low voltage generators 230 are described above as being in the "off" operational state and/or mode when the utility 210 is delivering a flow of electric power and transitioned to the "on" operational state and/or mode when the electric power from the utility 210 is interrupted, in other embodiments, the power system 200 can be configured to balance the load 245 and/or to provide electric power to the utility 210 (e.g., the power grid). For example, in some embodiments, the PLC (described above) can be configured to execute a set of instructions, code, and/or processes that can transition the low voltage generators 230 from the "off" operational state and/or mode to the "on" operational state and/or mode while the supply of electric power from the utility 210 is stopped (e.g., in a predetermined manner and/or intentionally stopped or reduced). As described above, the medium voltage UPS 215 can be configured to discharge electric power stored by the medium voltage UPS 215 when the utility 210 stops supplying electric power (e.g., during predetermined times such as peak power use for the utility 210) and as the low voltage generators 230 are transitioned to the "on" operational state and/or mode. When the low voltage generators 230 are in the "on" operational state and/or mode and are supplying at least a first portion of the generated power to the load 245, the power system 200 can transition to a configuration (e.g., via a transition of an operational state and/or mode of the low voltage switchgears 235A and/or 235B and/or the medium voltage switchgears 220A and/or 220B) in which a second portion of the generated electric power is supplied to the utility 210, as described above with reference to the power system 100. As such, the low voltage generators 230 can generate electric power that can be supplied to the load 245 and supplied to the utility 210 (e.g., about 50% of the generated electric power can be supplied to the load 245 and about 50% of the generated electric power can be supplied to the utility 210). In some instances, a portion of the generated electric power can be supplied to the medium voltage UPS 215. For example, in some instances, at least one of the low voltage switch gears 235A or 235B, at least one of the associated transformers 225, and/or at least one of the medium voltage switchgears 220A or 220B can be transitioned to a configuration in which electric power can flow therethrough from the low voltage generators 230 to the medium voltage UPS 215.

In some instances, the medium voltage UPS 215 can also supply electric power to the utility 210. More specifically, in some embodiments, the low voltage generators 230 can be arranged as capacitors, supercapacitors, ultracapacitors, or the like. As such, the PLC can control the flow of electric power from the MVUPS 215 and the low voltage generators 230 and can, for example, sync the electric power and/or current with the utility 210. Thus, the MVUPS 215 and the low voltage generators 230 can supply at least a portion of an output electric power back to the grid. In other words, in some embodiments, at least a portion of the power system 200 can be bi-directional. As such, the power system 200 can facilitate load balancing and/or stabilization of the utility 210 (e.g., power grid). In some embodiments, the power system 200 can be configured to operate in a configuration that supplies electric power to the grid for a predetermined time (e.g., during peak energy usage, demand response, and/or the like). As such, the net electric power consumed by the load 245 over a given time can be reduced and the utility 210 can use an amount of electric capacity otherwise stored in the MVUPS 215 and/or not used by the power system 200.

As shown in FIG. 2, the power system 200 also includes the low voltage generator 260 and the associated transformer 265, which are in a redundancy configuration. For example, the low voltage generator 260 can be substantially similar to the low voltage generators 230; however, the low voltage generator 260 is upstream of the medium voltage switchgears 220A and 220B relative to the load 245. That is to say, the low voltage generator 260 is disposed further from the load 245 than the medium voltage switchgears 220A and 220B and/or is configured to supply a flow of electric power to the medium voltage switchgears 220A and 220B. As such, the transformer 265 (e.g., a step-up transformer) can be configured to receive the flow of the low voltage electric power generated by the low voltage generator 260 and can output a flow of electric power having, for example, a medium voltage (e.g., maintaining substantially constant electric power, the voltage can be increased by decreasing the current associated with the electric power). In this manner, the low voltage generator 260 can be configured to supply the medium voltage switchgears 220A and 220B with electric power in the event of a failure or partial of the MVUPS 215 and/or the like.

Figure 3:
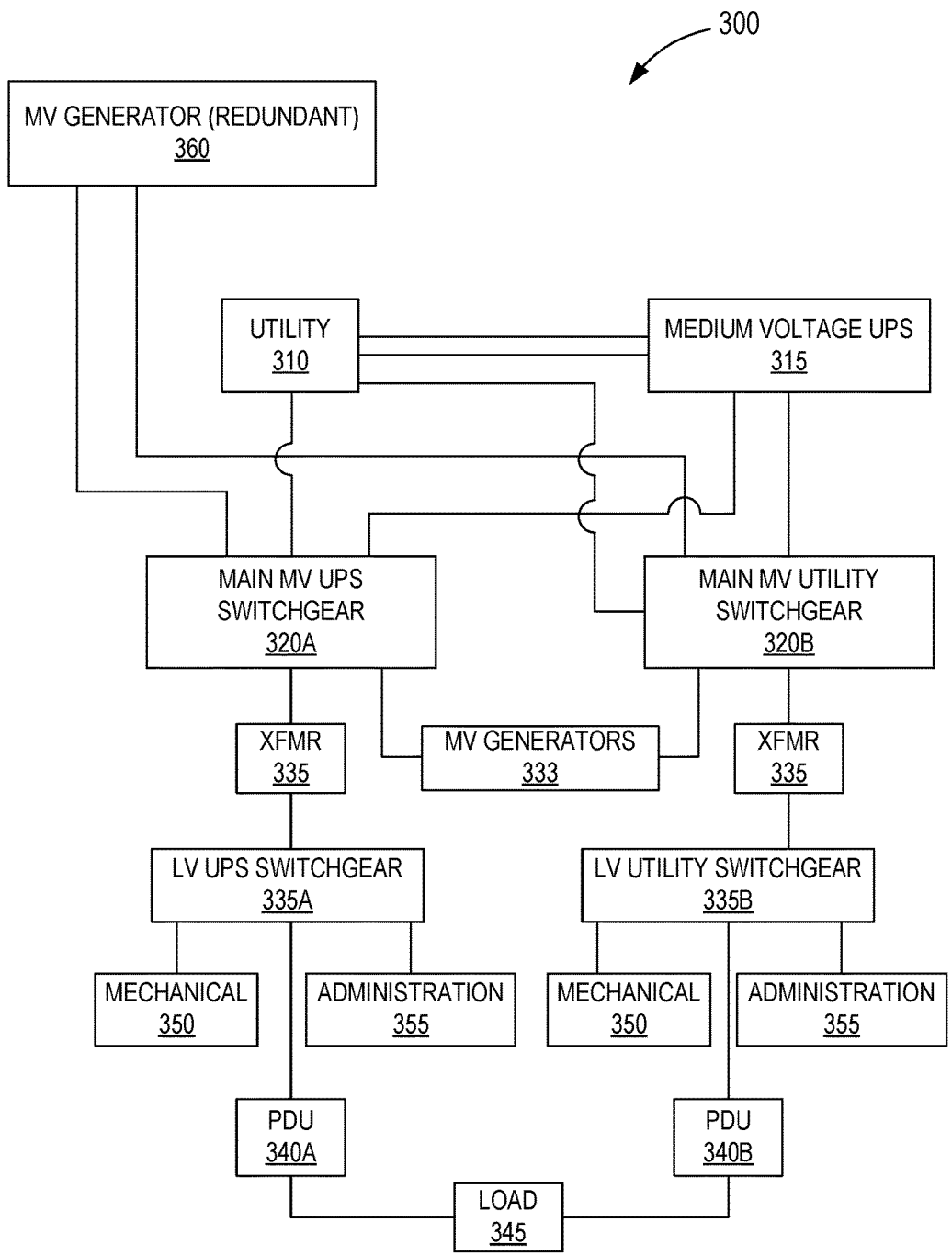
FIG. 3 is a schematic block diagram of an electric power system according to another embodiment.

While the power system 200 is particularly shown and described above with reference to FIG. 2, in other embodiments, a power system can have any suitable electric components arranged in any suitable manner. For example, FIG. 3 is a schematic block diagram of a power system 300 according to another embodiment. In this embodiment, the power system 300 can be configured to receive electric power from a power utility 310 (e.g., a power plant, substation, transmission line, and/or generally, a power grid) and to deliver at least a portion of the electric power to a load 345, as described in detail above with reference to the power system 200. The load 345, in this embodiment, can be a data center and more specifically, at least the electronic devices (e.g., servers, server blades, switches, and/or routers) included therein.

The power system 300 includes a medium voltage uninterruptible power supply 315, medium voltage switchgear 320A and 320B, transformers 325, medium voltage generators 333, step-down transformers 335, low voltage switchgear 335A and 335B, power distribution units (PDU) 340A and 340B, a load 345, mechanical equipment 350, administration equipment 355, and a redundant medium voltage generator 360. Although not shown in FIG. 3, in some embodiments, the power utility 310 (e.g., the power grid) can be associated with high voltage (e.g., greater than 115 kV) and as such, the power system 300 can include any suitable electrical component configured to step-down the electric power prior being provided to the other components of the power system 300 such as a step-down transformer, a PDU, and/or the like. In such embodiments, the power utility 310 can provide a flow of medium voltage electric power (e.g., a voltage within a medium voltage range between 4.16 kV and about 30 kV) to the power system 300. In other embodiments, the power utility 310 can provide any other suitable level of voltage. In some embodiments, the power system 300 can be substantially similar in form and function to the power system 200. That is to say, the power system 300 can be configured to deliver electric power to the load 345 despite interruption, irregularity, and/or fault in the electric power received from the utility 310. As such, portions and/or components of the power system 300 that are structurally and/or functionally similar to corresponding portions and/or components of the power system 200 are not described in further detail herein.

The power system 300 can differ from the power system 200, however, in the arrangement of the generator(s) 333 and/or the redundant generator 360. Specifically, while the generator(s) 230 and redundant generator 260 were described above as being associated with and/or otherwise operating at a low voltage and/or within a low voltage range, in FIG. 3, the generator 333 and the redundant generator 360 are configured to generate electric power having a medium voltage and/or a voltage within a medium voltage range. For example, the power system 300 can include one or more medium voltage generators 333, which can generate and/or otherwise deliver a flow of electric power with a medium voltage such as, for example, a voltage within a range of about 4.16 kV and about 15 kV. As shown in FIG. 3, the use of medium voltage generator 333 within the power system 300 can be such that medium voltage generator 333 is electrically connected to the medium voltage switchgear 320A and 320B. More specifically, the medium voltage generator 333 can be electrically connected to the medium voltage switchgear 320A and 320B without a transformer and/or other low voltage device and/or circuit installed therebetween. In some embodiments, such an arrangement can result in a simpler system, which can be more efficient and/or reliable. In a similar manner, the use of the medium voltage redundant generator 360 can allow the medium voltage redundant generator 360 to be electrically connected to the medium voltage switchgears 360 without a transformer and/or the like installed therebetween.

While the medium voltage generator(s) 333 and the redundant generator 360 are described as being associated with a medium voltage and/or otherwise operating within a medium voltage range, the function of the medium voltage generators 333 and 360 can be substantially similar to and/or the same as the function of the low voltage generators 230 and 360, respectively, described above with reference to FIG. 2. Thus, the function of the generators 333 and 360 is not described in further detail herein. While the medium voltage generator 333 and the redundant generator 360, in this embodiment, are associated with the medium voltage range, in other embodiments, the generator 333 can be associated with a low voltage range while the redundant generator 360 is associated with the medium voltage range, or vice versa.

Figure 4:
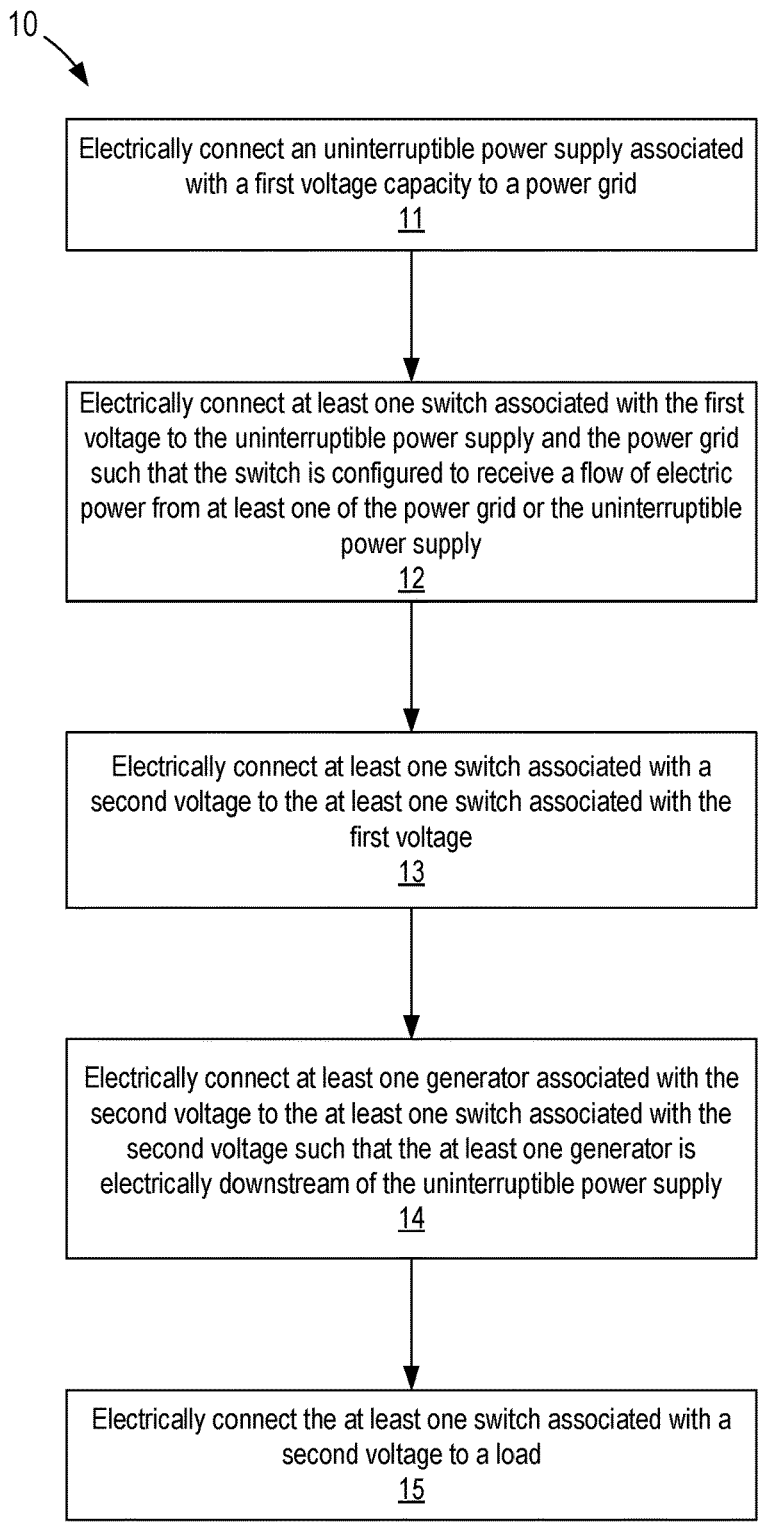
FIG. 4 is a flowchart illustrating a method of using a back-up power supply system according to an embodiment.

Referring now to FIG. 4, a flowchart is shown illustrating a method 10 of establishing a power system (e.g., a data center one-line) configured to provide uninterrupted electric power to a load according to an embodiment. In some embodiments, the load can be, for example, a data center or the like, as described in detail above. The method 10 includes electrically connecting an uninterruptible power supply associated with a first voltage to a power grid, at 11. The uninterruptible power supply (UPS) can be, for example, any suitable energy storage device. For example, the UPS can be a medium voltage UPS (such as the MVUPS 215 described in detail above) that is configured to receive, store, output, and/or otherwise operate at a medium voltage such as, for example, 4.16 kV and/or within a medium voltage range. In other embodiments, the medium voltage UPS can be associated with (e.g., operate at) a medium voltage within a range between about 2 kV and about 30 kV. In some embodiments, the medium voltage UPS can be modular including any suitable number of power modules associated with, for example, the load.

At least one switch associated with the first voltage is electrically coupled to the UPS and the power grid such that the switch is configured to receive a flow of electric power from at least one of the power grid or the UPS, at 12. The switch can be, for example, a medium voltage switchgear or the like. For example, in some embodiments, the switch can be substantially similar to the medium voltage switchgears 220A and/or 220B. In some embodiments, the power system can include at least two switchgears as described above with reference to the power system 200. In other embodiments, the power system can include less than two switchgears associated with the first voltage or more than two switchgears associated with the first voltage. Thus, electrically connecting the at least one switch associated with the first voltage includes electrically connecting each switch included in the power system.

At least one switch associated with a second voltage is electrically connected to the at least one switch associated with the first voltage, at 13. The switch can be, for example, a low voltage switchgear or the like such as the low voltage switchgears 235A and/or 235B. As described with reference to the at least one switch associated with the first voltage, the power system can include one switch associated with the second voltage, two switches associated with the second voltage, or more. As described above with reference to the power system 200, the first voltage can be, for example, a voltage within a medium voltage range between about 2 kV and about 15 kV, and the second voltage can be, for example, a voltage within a low voltage range, which is less than about 600 V. In other words, the second voltage is less than the first voltage. In some embodiments, the method 10 can optionally include electrically connecting at least one transformer between each switch associated with the first voltage and an associated switch associated with the second voltage. Such a transformer can be, for example, a step-down transformer or the like than can reduce and/or step-down a voltage from the first voltage (e.g., about 4.16 kV) to the second voltage (e.g., about 480 V).

While the electrical connecting of the at least one switch associated with the first voltage and the electrical connecting of the at least one switch associated with the second voltage are shown in FIG. 4 and described above as being independent and/or separate steps (e.g., at 12 and at 13, respectively), in other embodiments, the steps can be combined by including the at least one switch associated with the first voltage and the at least one switch associated with the second voltage in a single switchgear device or switchgear assembly. In some embodiments, the at least one switch can be a switchgear assembly or the like as described above with reference to the power system 200. In such embodiments, the switchgear assembly can include medium voltage switchgear (e.g., in a first portion of the switchgear assembly) and low voltage switchgear (e.g., in a second portion of the switchgear assembly). In addition, such a switchgear assembly can include any suitable transformer or the like electrically connected between, for example, medium voltage switchgear and low voltage switchgear.

At least one generator associated with the second voltage is electrically connected to the at least one switch associated with the second voltage such that the at least one generator is electrically downstream of the UPS relative to a flow of electric power from the power grid and/or the UPS, at 14. More particularly, the at least one generator is electrically downstream of the UPS relative to a flow of electric power from the power grid and/or the UPS to the load. In some instances, the at least one generator associated with the second voltage can be, for example, closer to the load than the UPS (e.g., downstream). As described above with reference to the power systems 100 and/or 200, each generator can be, for example, a low voltage generator and/or the like. In some embodiments, the at least one generator can be configured to output electric power with a voltage at about 480 V and/or otherwise within a low voltage range. As described above, the at least one generator can be configured to provide electric power having a low voltage to the at least one switch associated with the second voltage, for example, when an electric power received at the at least one switch associated with the second voltage and from the UPS and/or the power grid satisfies a criterion (e.g., is below a predetermined threshold). In some instances, for example, the criterion can be a low electric power threshold (e.g., the power and/or voltage received from the power grid is below a predetermined threshold), a high electric power threshold (e.g., the power and/or voltage received from the power grid is above a predetermined threshold), and/or a threshold associated with a rate of change in electric power received from the power grid (e.g., a rate of change or variance of power and/or voltage received from the power grid is above a predetermined threshold). For example, in some embodiments, the power system can include a controller such as a relay logic and/or a PLC configured to determine at least one operating condition, state, and/or mode of the power system and configured to send a signal to the at least one generator to cause the at least one generator to transition from an "off" operational state and/or mode to an "on" operational state and/or mode, as described above with reference to the power system 200.

The at least one switch associated with the second voltage is electrically connected to the load, at 15. As described above, in this embodiment, the load is a data center or the like. In other embodiments, the load can be any suitable electric circuit and/or device(s) configured to receive substantially uninterrupted electric power. In some embodiments, electrically connecting the at least one switch associated with the second voltage to the load includes electrically connecting the at least one switch associated with the second voltage to a power distribution unit, which in turn, is electrically connected to the load. Thus, the load is configured to receive electric power from the at least one switch associated with the second voltage.

In some instances, electrically connecting the power system to the power grid and to the load (e.g., data center) can allow the power system to be initiated and/or activated such that the load receives a substantially uninterrupted flow of electric power from the power system. As described above, the substantially uninterrupted flow of electric power can be electric power from the power grid, the UPS, and/or one or more generators (e.g., one or more power generation devices). In some instances, initiating the power system can include, for example, providing a set of instructions and/or code (e.g., stored in memory and executed in at least one processor) operable to activate, operate, and/or otherwise control at least a portion of the power system. For example, in some instances, initiating and/or activating the power system can result in a controller (e.g., a PLC or the like) executing the set of instructions or code to such that the first portion of the switchgear assembly receives a flow of electric power from the power grid and/or the UPS. When the flow of electric power from the power grid to the first portion of the switchgear assembly satisfies a criterion (e.g., is within a given threshold and/or tolerance), the controller can maintain the generator in the "off" operational state and/or mode (e.g., the generator does not output a voltage). If the flow of electric power from the power grid satisfies a criterion (e.g., is not within the given threshold and/or tolerance), the controller can execute instructions and/or code operable in transitioning the generator from the "off" operational state and/or mode to the "on" operational state and/or mode. Furthermore, as the generator transitions from to the "on" operational state, the UPS can continue to provide a flow of electric power to the first portion of the switchgear assembly. In this manner, the power system and/or any of the components included therein can be initiated, activated, and/or otherwise controlled such that a substantially uninterrupted flow of electric power is supplied to the load.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. A system, comprising:
 a medium voltage uninterruptible power supply (UPS) associated with a first voltage range and configured to be electrically and directly connected to a power grid, the medium voltage UPS configured to transition between a first configuration, in which electric power flows between the power grid and a load, and a second configuration, in which a flow of electric power between the power grid and the load is interrupted;
 a first switching circuit connected to the medium voltage UPS and configured to switch an electrical connection between the medium voltage UPS and the power grid;
 a transformer connected to the first switching circuit and configured to step down electric power having a voltage within the first voltage range to electric power having a voltage within a second voltage range;
 a power distribution assembly coupled to the transformer and configured to (1) receive a flow of electric power having the voltage within the second voltage range from the transformer and (2) supply a flow of electric power having the voltage within the second voltage range less than the first voltage range to the load;
 a power generation device associated with the second voltage range and electrically connected to the power distribution assembly, the power generation device configured to transition from a first mode to a second mode when the medium voltage UPS transitions from the first configuration to the second configuration, the power generation device configured to temporarily supply a flow of electric power to the power distribution assembly in the second mode when the medium voltage UPS is in the second configuration such that the power distribution assembly supplies a substantially uninterrupted flow of electric power having the voltage within the second voltage range to the load; and a second switching circuit directly connected between the transformer and the power distribution assembly, the second switching circuit configured to switch an electrical connection between the transformer and the power generation device in response to the transition to the second mode.

2. The system of claim 1, wherein the power distribution assembly includes at least one of a switch, a fuse, a circuit breaker, a transformer, or a power distribution unit.

3. The system of claim 1, wherein the power generation device is at least one low voltage generator, a voltage output of the at least one low voltage generator being zero when in the first mode, a voltage output of the low voltage generator being greater than zero and within the second voltage range when in the second mode.

4. The system of claim 1, wherein at least one electric circuit is defined between the medium voltage UPS and the load, the power generation device being electrically connected to the at least one electric circuit at a position within the at least one electric circuit downstream of a position within the electric circuit at which the medium voltage UPS is connected to the at least one electric circuit, when a flow of electric power flows through the at least one electric circuit from at least one of the power grid and the medium voltage UPS toward the load.

5. The system of claim 1, wherein the medium voltage UPS includes a set of energy storage modules, an energy storage capacity of the medium voltage UPS being increased when at least one energy storage module is added to the set of energy storage modules, the energy storage capacity of the medium voltage UPS being decreased when at least one energy storage module is removed from the set of energy storage modules.

6. The system of claim 1, wherein the first voltage range is a medium voltage range between about 600 volts (V) and about 69,000 V and the second voltage range is a low voltage range between about 0 V and about 600 V, the power distribution assembly configured to supply the load with a flow of electric power having a voltage within the low voltage range.

7. The system of claim 1, wherein the medium voltage UPS is configured to transition between the first configuration, the second configuration, and a third configuration, the medium voltage UPS configured to supply a flow of electric power to the power grid when in the third configuration.

8. A system, comprising:
a medium voltage UPS associated with a first voltage range and configured to be electrically and directly connected to a power grid to allow a flow of electric power between the power grid and the medium voltage UPS, the power grid and the medium voltage UPS each configured to be electrically connected to a load via a power distribution assembly;
a first switching circuit connected to the medium voltage UPS and configured to switch an electrical connection between the power grid and the medium voltage UPS;
a transformer connected to the first switching circuit and configured to step down electric power having a voltage within the first voltage range to electric power having a voltage within a second voltage range less than the first voltage range;
a power generation device associated with the second voltage range, the power generation device configured to be electrically connected to the power distribution assembly at a position between the load and the medium voltage UPS and to transition from a first mode to a second mode to supply a flow of electric power to the load based on a criterion, the medium voltage UPS configured to temporarily supply a flow of electric power to the load as the power generation device transitions from the first mode to the second mode such that the load receives a substantially uninterrupted flow of electric power, the substantially uninterrupted flow of electric power supplied by at least one of the medium voltage UPS or the power generation device having the voltage within the second voltage range; and
a second switching circuit directly connected between the transformer and the power distribution assembly, the second switching circuit configured to switch an electrical connection between the power generation device and the transformer in response to the transition to the second mode.

9. The system of claim 8, wherein the power generation device includes at least a primary low voltage generator and a redundant low voltage generator.

10. The system of claim 8, wherein the load is an electrical load produced by a data center, the data center including at least a plurality of electronic devices and a mechanical temperature control system.

11. The system of claim 8, wherein the criterion is at least one of a low electric power threshold, a high electric power threshold, or a threshold associated with a rate of change in electric power received from the power grid.

12. The system of claim 8, wherein a voltage output of the power generation device is zero when in the first mode, and wherein a voltage output of the power generation device being increased from zero to a voltage within the second voltage range when the power generation device transitions from the first mode to the second mode.

13. The system of claim 8, wherein the power generation device is configured to be disposed at a position that is electrically closer to the load than a position of the medium voltage UPS.

14. The system of claim 13, wherein the power generation device is configured to be disposed at a position physically closer to the load than a position of the medium voltage UPS.

15. The system of claim 8, wherein the medium voltage UPS is configured to transition between a first configuration, in which the medium voltage UPS receives a flow of electric power from the power grid while the power grid supplies a flow of electric power to the load, and a second configuration, in which the medium voltage UPS supplies a flow of electric power to the power grid while the power grid supplies a flow of electric power to the load.

16. The system of claim 15, wherein the medium voltage UPS is configured to transition between the first configuration, the second configuration, and a third configuration, in which the medium voltage UPS is configured to supply a flow of electric power to the power grid while the power grid does not transfer electric power to the load.

17. A method, comprising:
electrically and directly connecting an uninterruptible power supply (UPS) associated with a medium voltage range to a power grid;
electrically connecting a first switchgear assembly to the UPS and the power grid to receive a flow of electric power having a voltage within the medium voltage range from at least one of the power grid or the UPS;
stepping down, by a transformer, electric power having the voltage within the medium voltage range from the first switchgear assembly to electric power having a voltage within a low voltage range less than the medium voltage range;
electrically connecting a first portion of a second switchgear assembly to the transformer, the first portion of the second switchgear assembly configured to receive a flow of electric power having a voltage within the low voltage range from the transformer;
electrically connecting at least one generator associated with the low voltage range to a second portion of the second switchgear assembly, the at least one generator configured to selectively supply a flow of electric power having a voltage within the low voltage range to the second portion of the second switchgear assembly, the at least one generator being electrically downstream of the first switchgear assembly such that the at least one generator is electrically downstream of the UPS; and
electrically connecting the second portion of the second switchgear assembly directly to a load, the second portion of the second switchgear assembly configured to supply a flow of electric power having a voltage within the low voltage range directly to the load.

18. The method of claim 17, further comprising:
initiating the first switchgear assembly to receive a flow of electric power from the power grid and the UPS when the at least one generator is in a first configuration in which a voltage output of the at least one generator is zero.

19. The method of claim 18, further comprising:
initiating the at least one generator such that (1) the at least one generator is transitioned from the first configuration to a second configuration in response to a change in electric power flowing from the power grid to the first switchgear assembly, (2) the second switchgear assembly supplies the load with a substantially uninterrupted flow of electric power having a voltage within the low voltage range when the at least one generator is transitioning from the first configuration to the second configuration, and (3) when in the second configuration, the at least one generator supplies the second portion of the second switchgear assembly with a flow of electric power having a voltage within the low voltage range.

20. The method of claim 17, further comprising:
initiating the UPS such that the UPS supplies a flow of electric power to the power grid.

* * * * *